(12) United States Patent
Kimura et al.

(10) Patent No.: US 7,396,867 B2
(45) Date of Patent: Jul. 8, 2008

(54) ORGANOPOLYSILOXANE COMPOSITION FOR BONDING TO MAGNESIUM ALLOY

(75) Inventors: Tsuneo Kimura, Gunma-ken (JP); Mamoru Teshigawara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 389 days.

(21) Appl. No.: 11/099,483

(22) Filed: Apr. 6, 2005

(65) Prior Publication Data

US 2005/0228091 A1 Oct. 13, 2005

(30) Foreign Application Priority Data

Apr. 7, 2004 (JP) ............................. 2004-112930

(51) Int. Cl.
*C08K 5/24* (2006.01)
(52) U.S. Cl. ..................................................... 524/261
(58) Field of Classification Search ................ 524/261; 528/34
See application file for complete search history.

(56) References Cited

U.S. PATENT DOCUMENTS

| 4,399,267 | A | * | 8/1983 | Bosch et al. | ................... | 528/30 |
| 4,973,644 | A | * | 11/1990 | Onishi et al. | ................... | 528/15 |
| 2003/0162928 | A1 | | 8/2003 | Sadanaga et al. | | |
| 2004/0266923 | A1 | * | 12/2004 | Fehn et al. | ................... | 524/261 |

FOREIGN PATENT DOCUMENTS

| JP | 2001/059194 A | 6/2001 |
| JP | 2002-309219 A | 10/2002 |
| JP | 2003-535152 A | 11/2003 |
| WO | WO-01/36537 A1 | 5/2001 |

\* cited by examiner

*Primary Examiner*—Robert S. Loewe
(74) *Attorney, Agent, or Firm*—Birch, Stewart, Kolasch & Birch, LLP

(57) ABSTRACT

An organopolysiloxane composition for bonding to magnesium alloys comprises (A) 100 parts by weight of an organopolysiloxane of the following general formula (1) and/or (2)

$$HO(SiR_2O)_nH \qquad (1)$$

$$(CH_3O)_{3-m}\overset{R_m}{\underset{|}{Si}}-X-(SiR_2O)_n-SiR_2-X-\overset{R_m}{\underset{|}{Si}}(OCH_3)_{3-m} \qquad (2)$$

wherein R may be the same or different and represents a substituted or unsubstituted monovalent hydrocarbon group having 1 to 10 carbon atoms, and n is an integer of at least 10, X represents an oxygen atom or an alkylene group having 2 to 5 carbon atoms, and m independently represents an integer of 0 or 1, (B) 0.1 to 50 parts by weight of an organosilicon compound having at least three hydrolyzable groups bonded to silicon atoms in one molecule and/or a partial hydrolyzate thereof, and (C) 0.1 to 15 parts by weight of an acidic silane coupling agent.

5 Claims, No Drawings

ORGANOPOLYSILOXANE COMPOSITION FOR BONDING TO MAGNESIUM ALLOY

CROSS-REFERENCE TO RELATED APPLICATION

This non-provisional application claims priority under 35 U.S.C. §119(a) on Patent Application No. 2004-112930 filed in Japan on Apr. 7, 2004, the entire contents of which are hereby incorporated by reference.

BACKGROUND OF THE INVENTION

This invention relates to an organopolysiloxane composition for bonding to magnesium alloys which is cured at room temperature into a cured product having an excellent bonding property to magnesium alloys.

In recent years, magnesium alloys, typically AZ-31, AZ-91 and the like, have distinct features of lightweight and high strength, a good corrosion resistance, good designing properties and good recycling properties, and have been frequently used in information electronic devices such as mobile phones, digital video recorders, digital cameras, liquid crystal projectors, plasma displays, personal computers, MD players, DVD recorders and the like, and also in transport machine parts such as electric components, vehicle oil pans, intake manifolds, lock housing parts, steering upper brackets, steering wheels and the like. Organopolysiloxane compositions for bonding to magnesium alloys exhibiting good self-adhesiveness to these members are now needed.

However, magnesium alloys are adherends which are difficult to bond. Eventually, chemical conversion treatment is essential for bonding. Sealing members or adhesives exhibiting good self-adhesiveness without the conversion treatment have been never studied. More particularly, only several types of organopolysiloxane compositions having self-adhesiveness to magnesium alloys have been proposed up to now. JP-A 2003-535152 discloses a composition comprising a curable silicone and an amino group-containing silane adhesion promoter serving as a filler. JP-A 2002-309219 has proposed a composition comprising a silicone oil and a curing agent composed of an inorganic compound containing a metal element whose tendency of ionization is smaller than that of magnesium. However, the former composition is not satisfactory with respect to the effectiveness of the amino group-containing silane adhesion promoters such as γ-aminopropyltrialkoxysilane, trialkoxypropylethylenediamine and the like. With the latter, limitation is placed on the type of filler used, thus lacking in the freedom for material designing.

SUMMARY OF THE INVENTION

Accordingly, it is an object of the present invention to provide an organopolysiloxane composition for bonding to magnesium alloys which has good self-adhesiveness to magnesium alloys.

In order to achieve the above object, we have paid attention to the particularity of a magnesium alloy adherend and made intensive studies thereon. As a result, it has been found that an organopolysiloxane composition having the following components ensures good self-adhesiveness to a magnesium alloy. More particularly, the organopolysiloxane composition includes: (A) an organopolysiloxane of the following formula (1) and/or (2); (B) an organosilicon compound having at least three hydrolyzable groups bonded to silicon atoms in one molecule; (C) an acidic silane coupling agent, and, preferably, (D) at least one filler.

More detailedly, an amino group-containing silane adhesion promoter is effective against an ordinary adherend, typically glass or the like. However, the amino group-containing silane adhesion promoter is poor in bonding to magnesium alloys, as will be seen from the results of Comparative Examples described hereinafter, in which γ-aminopropyltriethoxysilane or ethylenediaminopropyltrimethoxysilane is used. On the other hand, when an acidic silane coupling agent such as an acid anhydride-functional silane coupling agent is used, the bonding property to magnesium alloys is remarkably improved. The invention has been accomplished based on this finding.

According to an aspect of the invention, there is provided an organopolysiloxane composition for bonding to magnesium alloys comprising (A) 100 parts by weight of an organopolysiloxane of the following general formula (1) or (2) or a mixture thereof,

wherein R may be the same or different and represents a substituted or unsubstituted monovalent hydrocarbon group having 1 to 10 carbon atoms, and n is an integer of at least 10,

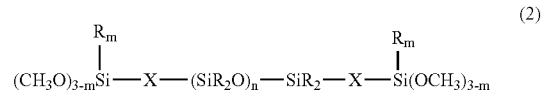

wherein R and n have the same meanings as above, X represents an oxygen atom or an alkylene group having 2 to 5 carbon atoms, and m independently represents an integer of 0 or 1;

(B) 0.1 to 50 parts by weight of an organosilicon compound having at least three hydrolyzable groups bonded to silicon atoms in one molecule and/or a partial hydrolyzate thereof; and (C) 0.1 to 15 parts by weight of an acidic silane coupling agent.

The organopolysiloxane composition for bonding to magnesium alloy is cured at room temperature and develops an excellent bonding property to magnesium alloy.

DETAILED DESCRIPTTION OF THE PREFERRED EMBODIMENTS

The organopolysiloxane composition for bonding to magnesium alloy according to the invention comprises (A) an oranopolysiloxane of the general formula (1) and/or (2) shown below;

(B) an organosilicon compound having at least three hydrolyzable groups bonded to silicon atoms in one molecule;

(C) an acidic silane coupling agent; and optionally, (D) at least one filler.

[Component (A)]

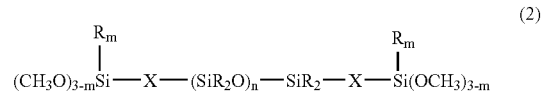

wherein R may be the same or different and represents a substituted or unsubstituted monovalent hydrocarbon group having 1 to 10 carbon atoms, n is an integer of 10 or over, X represents an oxygen atom or an alkylene group having 2 to 5 carbon atoms, and m independently represents an integer of 0 or 1.

In the general formulae (1) and (2), R represents a substituted or unsubstituted monovalent hydrocarbon group having 1 to 10 carbon atoms. Examples of the monovalent hydrocarbon group includes an alkyl group such as a methyl group, an ethyl group, a propyl group or the like, a cycloalkyl group such as a cyclohexyl group or the like, an alkenyl group such as a vinyl group, an allyl group or the like, an aryl group such as a phenyl group, a tolyl group or the like, and those groups wherein hydrogen atoms bonded to the carbon atom or atoms of these groups are partly substituted with a halogen atom or the like, e.g. a 3,3,3-trifluoropropyl group. Of these, a methyl, vinyl, phenyl or 3,3,3-trifluoropropyl group is preferred. Especially, methyl group is more preferable. Plural R's in the general formulae (1) and (2) may be the same or different, and n is an integer of 10 or over and should preferably be a value sufficient to bring a viscosity of the organopolysiloxane at 25° C. within a range of 25 to 500,000 Pa·s, preferably 500 to 100,000 Pa·s. It will be noted that in the practice of the invention, the viscosity is one which is measured at 25° C. by use of a rotational viscometer.

In the general formula (2), X represents an oxygen atom or an alkylene group having 2 to 5 carbon atoms. Examples include an ethylene group, a propylene group, a butylene group or the like. Of these, an oxygen atom or an ethylene group is preferred. Letter m is an integer of 0 or 1.

[Component (B)]

Component (B) used in the invention is an organosilicon compound which has at least three hydrolyzable groups bonded to silicon atoms in one molecule, and/or a partial hydrolyzate thereof. A preferred organosilicon compound is of the following general formula

wherein $R^1$ represents a monovalent hydrocarbon group, $R^2$ represents a hydrolyzable group, and "a" is 0 or 1, preferably 1.

The hydrolyzable group $R^2$ in the organosilicon compound and a partial hydrolyzate thereof includes, for example, a ketoxime group, an alkoxy group, an acetoxy group, an isopropenoxy group or the like.

The group $R^1$ other than the hydrolyzable group, which is bonded to a silicon atom, is a monovalent hydrocarbon group. The monovalent hydrocarbon group preferably has 1 to 10 carbon atoms, although it is not limited thereto. Examples of the monovalent hydrocarbon groups include an alkyl group such as a methyl group, an ethyl group, a propyl group, a butyl group or the lie, an alkenyl group such as a vinyl group or the like, and an aryl group such as a phenyl group or the like. Of these, a methyl group, an ethyl group, a vinyl group and a phenyl group are preferred.

Specific examples of component (B) include ketoximesilanes such as tetrakis(methylethylketoxime)silane, methyltris(dimethylketoxime)silane, methyltris(methylethylketoxime)silane, ethyltris(methylethylketoxime)silane, methyltris(methylisobutylketoxime)silane, vinyltris(methylethylketoxime)silane and the like, alkoxysilanes such as methyltriethoxysilane, vinyltrimethoxysilane, phenyltrimethoxysilane, tetramethoxysilane, vinyltriethoxysilane, tetraethoxysilane and the like, acetoxysilanes such as methyltriacetoxysilane, vinyltriacetoxysilane and the like, isopropenoxysilanes such as methyltriisopropenoxysilane, vinyltriisopropenoxysilane, phenyltriisopropenoxysilane and the like, and partially hydrolyzed condensates of these silanes. These may be used singly or in combination of two or more.

The amount of component (B) is within a range of 0.1 to 50 parts by weight, preferably 5 to 30 parts by weight per 100 parts by weight of component (A). When the amount is less than 0.1 part by weight, a satisfactory degree of crosslinkage may not be obtained, making it difficult to obtain a composition that ensures an intended rubber elasticity. On the other hand, when the amount exceeds 50 parts by weight, the resulting cured product is liable to lower in mechanical characteristics.

[Component (C)]

The acidic silane coupling agent of component (C) is essential for imparting good magnesium alloy adhesion to the composition. In the practice of the invention, the acidic silane coupling agent means a silane coupling agent which has a pH of 7 or below, preferably from 1 to 6.5, more preferably from 2 to 5.5 when dissolved in water to make a 5% by weight aqueous solution.

Such an acidic silane coupling agent includes, for example, an acid anhydride-functional silane coupling agent, a carboxylic acid-functional silane coupling agent, a sulfonic acid-functional silane coupling agent, a phosphoric acid-functional silane coupling agent, a phenol-functional silane coupling agent, a fluoroalcohol-functional silane coupling agent, a mercapto-functional silane coupling agent, or the like. Preferably, an acid anhydride-functional silane coupling agent, and a carboxylic acid-functional silane coupling agent are used, of which an acid anhydride-functional silane coupling agent is more preferable.

The amount of the acidic silane coupling agent is within a range of 0.1 to 15 parts by weight, preferably from 0.3 to 10 parts by weight, per 100 parts by weight of component (A). If the amount is less than 0.1 part by weight, satisfactory magnesium alloy adhesiveness may not be obtained. The amount larger than 15 parts by weight results in a cured product that is hard and brittle, with an additional disadvantage in economy.

[Component (D)]

The filler of component (D) may be further formulated in accordance with the invention. The filler may be a reinforcing or non-reinforcing filler capable of imparting rubber physical properties to the composition of the invention. Such a filler includes, for example, surface-treated or untreated fumed silica, precipitated silica, wet silica, carbon powder, talc, bentonite, surface-treated or untreated calcium carbonate, zinc carbonate, magnesium carbonate, surface-treated or untreated calcium oxide, zinc oxide, magnesium oxide, aluminium oxide, aluminium hydroxide or the like. These may be used singly or in combination of two or more.

The amount of the filler is preferably within a range of 1 to 500 parts by weight, more preferably 5 to 450 parts by weight, per 100 parts by weight of the component (A). If the amount is less than 1 part by weight, satisfactory strength of adhesion to magnesium alloy may not be expected because of the shortage of rubber strength. When the amount exceeds 500 parts by weight, the viscosity of the resulting composition becomes so high that working properties may undesirably low.

[Other Components]

So far as no adverse influences are given to curability at room temperature or self-adhesiveness to magnesium alloys, ordinary additives and catalysts other than the above-defined components may be added. Examples of the additives include a polyether serving as an improver for thixotropy, colorants such as pigments, dyes and the like, heat resistance improvers such as red oxide, cerium oxide and the like, cold-proof improvers, rust inhibitors, plasticizers, oil resistance improvers such as potassium methacrylate, and the like. If necessary, bactericides and antimicrobial agents may be added. As the catalyst, organotin ester compounds, organotin chelate compounds, alkoxytitanium compounds, titanium chelate compounds, silicon compounds having a guanidyl group and the like may be used.

[Preparation of Composition]

The preparation of the organopolysiloxane composition according to the invention is not critical, and the composition can be obtained by mixing the given amounts of the above-defined components according to ordinary procedures.

When the organopolysiloxane composition is used for bonding to magnesium alloys, good self-adhesiveness to magnesium alloys is exhibited without chemical conversion treatment of the alloys.

The organopolysiloxane composition is cured when allowed to stand at room temperature. With respect to the forming or molding method and curing conditions, the known methods and conditions which may depend on the type of composition can be adopted as usual.

EXAMPLES

Examples are shown to illustrate the invention and should not be construed as limiting the invention thereto. Comparative Examples are also shown. In these examples and comparative examples, viscosity is shown as a value measured by means of a rotational viscometer at 25° C.

Example 1

100 parts by weight of colloidal calcium carbonate whose surface was treated with a fatty acid was mixed, by means of a mixer, with 100 parts by weight of polydimethylsiloxane having a viscosity of 50,000 Pa·s and blocked with a hydroxyl group at both ends thereof. Thereafter, 10 parts by weight of vinyltributanoximesilane, 0.1 part by weight of dioctyltin dilaurate, and 1 part by weight of γ-mercaptopropyltrimethoxysilane were added to the mixture and fully mixed under reduced pressure to obtain composition 1. It will be noted that a 5% by weight aqueous solution of γ-mercaptopropyltrimethoxysilane had a pH of 5.9.

Example 2

100 parts by weight of zinc oxide and 10 parts by weight of fumed silica whose surface was treated with dimethyldichlorosilane were added to 100 parts by weight of polydimethylsiloxane having a viscosity of 50,000 Pa·s and blocked with a trimethoxy group at both ends thereof and mixed by means of a mixer. Thereafter, 3 parts by weight of vinyltrimethoxysilane, 3 parts by weight of diisopropoxytitanium bisacetylacetonate and 1 part by weight of succinic anhydride propyltrimethoxysilane were added to the mixed and fully mixed under reduced pressure to obtain composition 2. It will be noted that a 5% by weight aqueous solution of succinic anhydride propyltrimethoxysilane had a pH of 4.8.

Comparative Example 1

The general procedure of Example 1 was repeated except that 1 part by weight of γ-aminopropyltriethoxysilane was used in place of 1 part by weight of γ-mercaptopropyltrimethoxysilane used in Example 1, thereby obtaining composition 3. It will be noted that a 5% by weight aqueous solution of γ-aminopropyltriethoxysilane had a pH of 8.9.

Comparative Example 2

The general procedure of Example 1 was repeated except that 1 part by weight of ethylenediaminopropyltrimethoxysilane was used in place of 1 part by weight of γ-mercaptopropyltrimethoxysilane used in Example 1, thereby obtaining composition 4. It will be noted that a 5% by weight aqueous solution of ethylenediaminopropyltrimethoxysilane had a pH of 9.8.

These silicone rubber compositions were each cast into a mold form and aged over 7 days under conditions of 23° C. and 50% R.H., thereby obtaining a 2 mm thick rubber sheet. The 2 mm thick rubber sheet was subjected to measurement according to a method described in JIS K6249 to determine physical properties of the rubber (hardness, elongation at break, and tensile strength), with the results shown in Table 1.

Samples for adhesive strength under shear were made using each silicone rubber composition and 25 mm wide and 100 mm long magnesium alloy sheets (of the two types AZ-91 and AZ-31) so that each sample had an adhesion area of 2.5 mm$^2$ and an adhesive thickness of 1 mm. After aging under conditions of 23° C. and 50% R.H., over 7 days, an adhesive strength under shear and a rate of cohesive failure were measured according to the procedure of JIS K6850. The results are also shown in Table 1.

TABLE 1

|  |  | Example | | Comparative Example | |
|---|---|---|---|---|---|
|  |  | 1 | 2 | 1 | 2 |
| Physical Properties | Hardness (Durometer A) | 53 | 50 | 55 | 54 |
|  | Elongation at break (%) | 450 | 600 | 420 | 460 |
|  | Tensile strength (MPa) | 3.2 | 3.9 | 3.2 | 3.0 |
|  | Adhesive strength under shear of AZ-91 (MPa) | 2.0 | 2.7 | 0.5 | 0.2 |
|  | Rate of cohesive failure of AZ-91 (%) | 80 | 100 | 0 | 0 |
|  | Adhesive strength under shear of AZ-31 (MPa) | 1.9 | 2.4 | 0.3 | 0.4 |
|  | Rate of cohesive failure of AZ-31 (%) | 70 | 100 | 0 | 0 |

Japanese Patent Application No. 2004-112930 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A self-adhesive organopolysiloxane composition for bonding to magnesium alloys comprising (A) 100 parts by weight of an organopolysiloxane of the following general formula (1) or (2) or a mixture thereof, $$HO(SiR_2O)_nH \qquad (1)$$

wherein R may be the same or different and represents a halogen-substituted or unsubstituted alkyl, cycloalkyl or aryl group having 1 to 10 carbon atoms, and the letter n is an integer of at least 10,

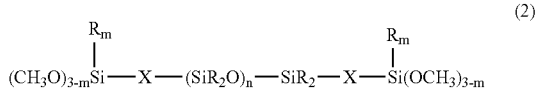

(2)

wherein R and n have the same meanings as above, X represents an oxygen atom or an alkylene group having 2 to 5 carbon atoms, and the letter m independently represents an integer of 0 or 1;

(B) 0.1 to 50 parts by weight of an organosilicon compound having at least three hydrolyzable groups bonded to silicon atoms in a molecule and/or a partial hydrolyzate thereof; and (C) 0.1 to 15 parts by weight of an acidic silane coupling agent selected from the group consisting of an acid anhydride-functional silane coupling agent, a carboxylic acid-functional silane coupling agent, a sulfonic acid-functional silane coupling agent, a phosphoric acid-functional silane coupling agent, a phenol-functional silane coupling agent, and a fluoroalcohol-functional silane coupling agent.

2. The organopolysiloxane composition of claim 1, wherein the acidic silane coupling agent (C) has a pH of 7 or below in the form of a 5% by weight aqueous solution thereof.

3. The organopolysiloxane composition of claim 1, wherein the acidic acid silane coupling agent is an acid anhydride-functional silane coupling agent.

4. The organopolysiloxane composition of claim 1 which further comprises (D) 1 to 500 parts by weight of at least one filler per 100 parts by weight of component (A).

5. The organopolysiloxane composition of claim 1 wherein the organosilicon compound (B) is of the following general formula:

wherein $R^1$ represents a monovalent hydrocarbon group, $R^2$ represents a hydrolyzable group, and "a" is 0 or 1.

* * * * *